(12) United States Patent
Archipley et al.

(10) Patent No.: US 8,714,876 B2
(45) Date of Patent: May 6, 2014

(54) GULLY ASSEMBLY

(76) Inventors: Colin Archipley, Escondido, CA (US); Karen Archipley, Escondido, CA (US)

( * ) Notice: Subject to any disclaimer, the term of this patent is extended or adjusted under 35 U.S.C. 154(b) by 0 days.

(21) Appl. No.: 13/368,221

(22) Filed: Feb. 7, 2012

(65) Prior Publication Data

US 2013/0202358 A1 Aug. 8, 2013

(51) Int. Cl.
*A01G 31/00* (2006.01)

(52) U.S. Cl.
USPC .................................. 405/119; 405/36; 47/63

(58) Field of Classification Search
USPC .......................................... 405/36, 118, 119
See application file for complete search history.

(56) References Cited

U.S. PATENT DOCUMENTS

2002/0057945 A1* 5/2002 Dahowski et al. ............ 405/118

* cited by examiner

*Primary Examiner* — Tara M. Pinnock
(74) *Attorney, Agent, or Firm* — DLA Piper LLP (US)

(57) ABSTRACT

The system employs a two piece gully assembly to implement an NFT system. The system has a square-U shaped base with a flat lid that can be fastened to the base. One of the advantages of the assembly is in shipping where the bases and lids can be easily nested for transport. When compared to prior art gullies, the shipping volume of the present assembly is effectively minimized. In fact, ten gullies of the present assembly can be shipped in the same volume as a single prior art gully.

7 Claims, 4 Drawing Sheets

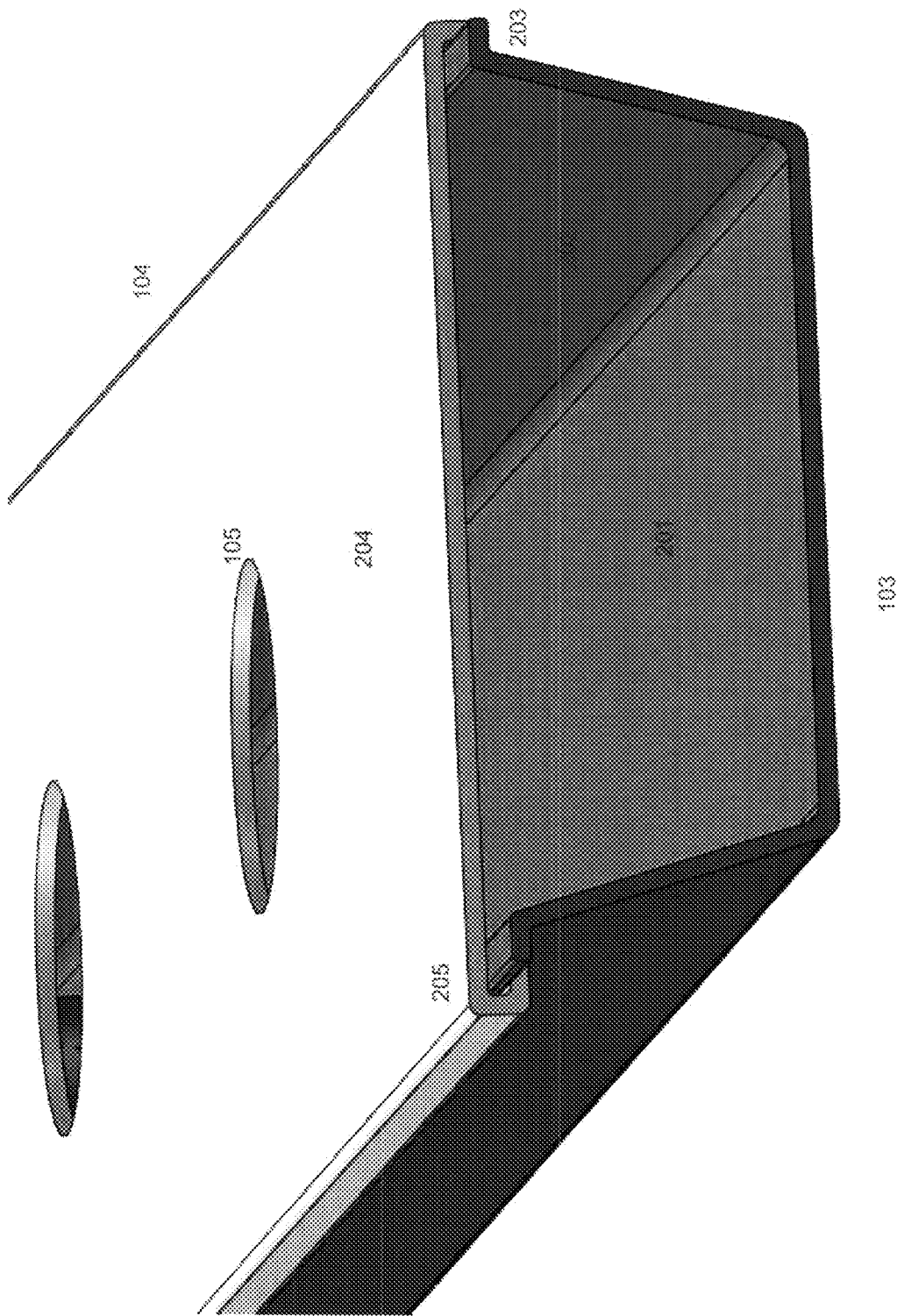

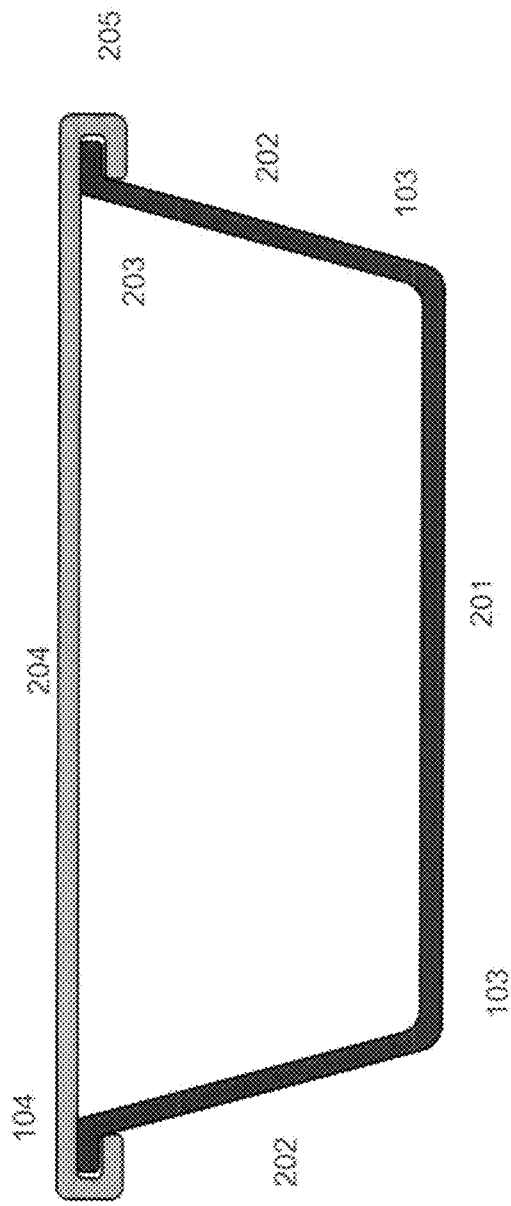

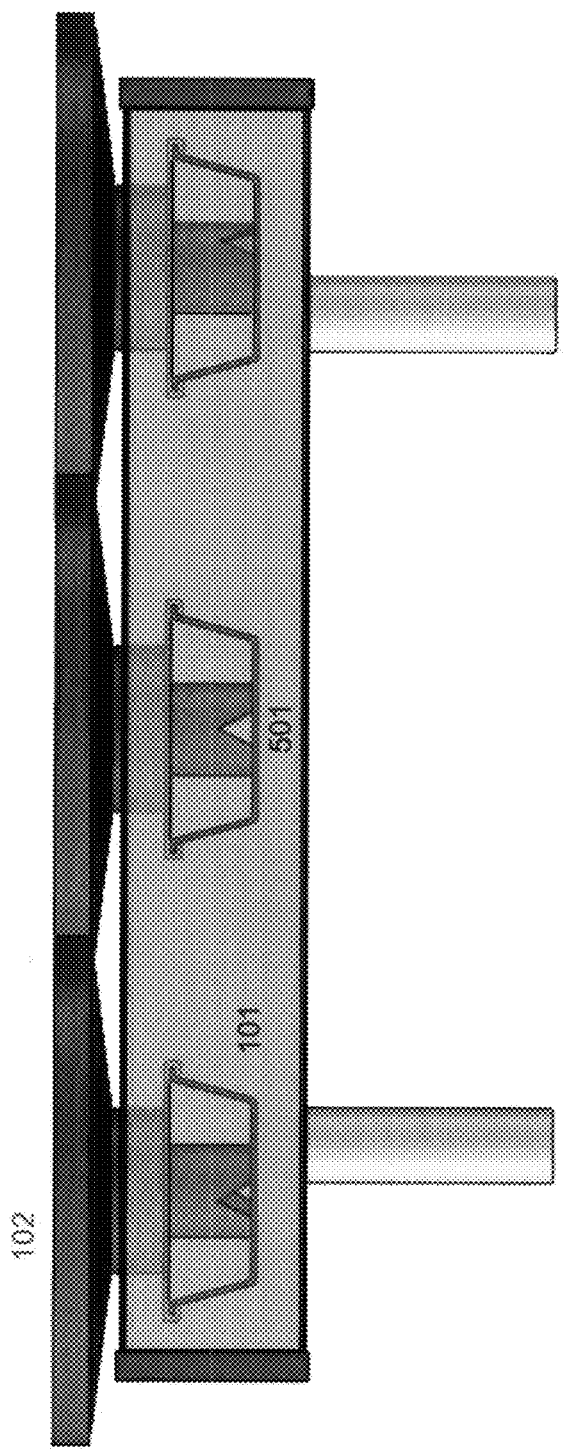

GULLY ASSEMBLY

BACKGROUND OF THE SYSTEM

There have been a number of approaches to the cultivation of plants and crops. In particular, where water supplies are limited, cultivation systems that maximize water usage and minimize water loss. One such method is a system that uses no soil and is known as the Nutrient Film Technique (NFT). In NFT, a shallow stream of water containing dissolved nutrients is re-circulated past the bare roots of a plant in a watertight gully. The gully of an NFT system is typically a single piece comprised of circular, oval, or square pipe with openings formed along the top surface for holding plants while still allowing the root to extend into the interior of the gully. The gullies themselves are typically mounted on a slope so that the nutrient water can flow past the roots without pooling in a particular area. The design goal of the system is to have as thin a film of liquid as possible. As the liquid flows out the lower sloped end of the gully, it is re-circulated via a pump to the other end of the pipe to continuously flow past the roots.

A disadvantage of current NFT systems is the design of the gullies themselves. The gullies suffer from several drawback including shipping problems, flow problems, inefficient water use, and maintenance problems.

SUMMARY OF THE SYSTEM

The system employs a two piece gully assembly to implement an NFT system. The system has a square-U shaped base with a flat lid that can be fastened to the base. One of the advantages of the assembly is in shipping where the bases and lids can be easily nested for transport. When compared to prior art gullies, the shipping volume of the present assembly is effectively minimized. In fact, ten gullies of the present assembly can be shipped in the same volume as a single prior art gully.

BRIEF DESCRIPTION OF THE DRAWINGS

FIG. 2 is perspective view of an embodiment of the gully assembly of FIG. 1.

FIG. 3 is a cross section of the gully assembly of FIG. 2.

FIG. 4 is a cross sectional view of an embodiment of the system.

DETAILED DESCRIPTION OF THE SYSTEM

Figure 1:
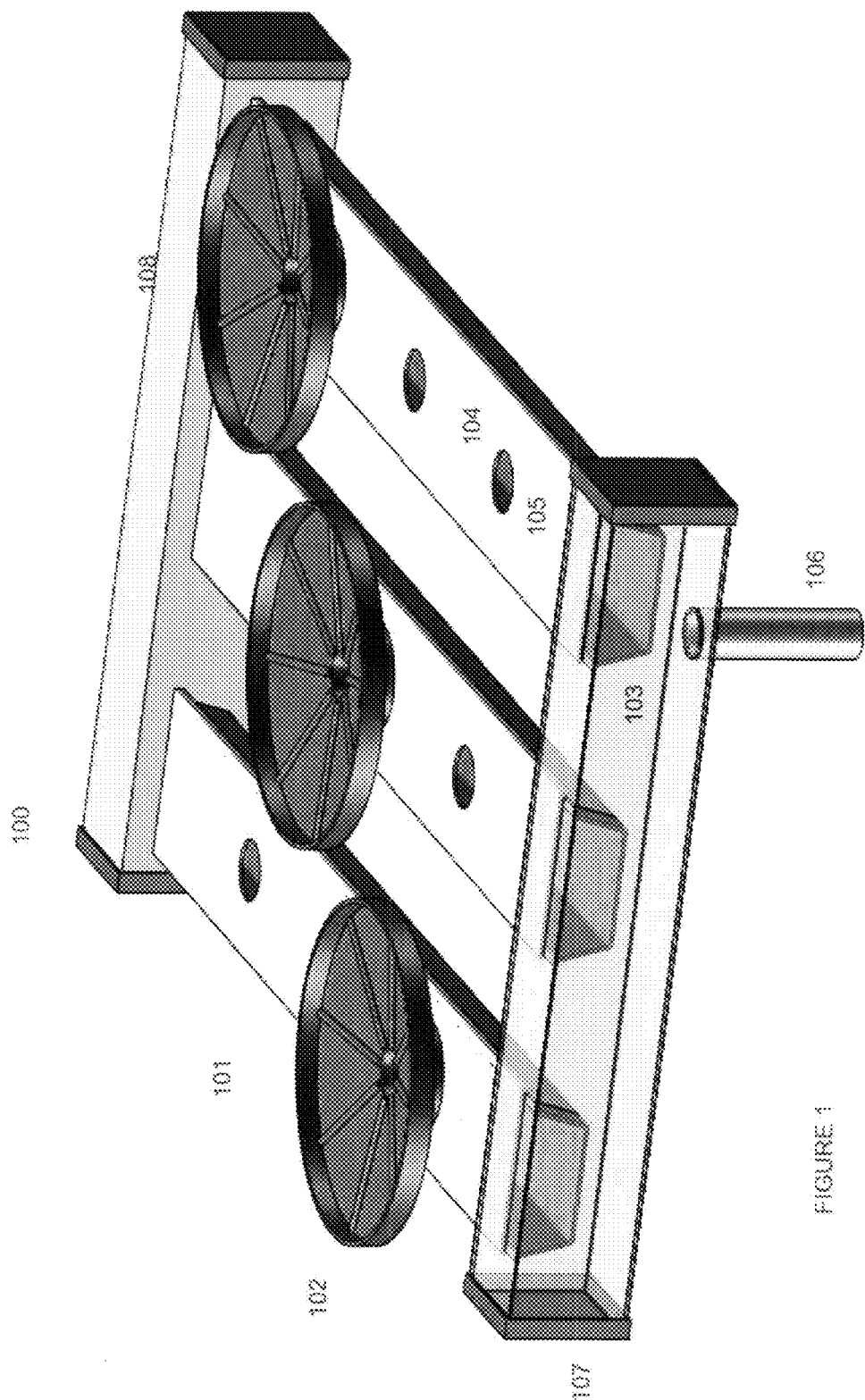
FIG. 1 is a perspective view of an embodiment of the system.

The system is a multi-piece gully assembly for use in cultivation such as an NFT system. FIG. 1 is a perspective view of an embodiment of the system. The system 100 includes a plurality of gullies such as gully assembly 101. The gully assembly 101 is comprised of a base 103 and lid 104. The lid 104 includes a plurality of openings 105 formed therein for inserting and holding plants.

In one embodiment, the system uses plant holders 102 to receive and hold a plant in opening 105. The gullies 101 are attached between channels 107 and 108. Channel 107 receives nutrient film run-off from the gullies 101 and re-circulates it to channel 108 via drain 106 to a re-circulating pump (not shown). The channels 107 and 108 have openings formed therein that are coincident with, and registered to, the gully assemblies 101 so that the system can be made as water-tight as possible. Openings 105 that are not used for plants or plant holders 102 are capped to reduce water loss in the system.

Although the example shows three gullies in the system, this is for illustrative purposes only and any number of gullies may be incorporated into the system without departing from the scope and spirit of the system. In addition, the number of openings 105 in the lid of the gully assemblies is for purposes of example only. In addition, the size and shape of the end channels 107 and 108 may be changed without departing from the scope and spirit of the system.

FIG. 2 is a perspective view of an embodiment of the gully assembly of the system. The base 103 comprises a flat bottom portion 201 and two side members 202. The side members 202 in this embodiment are positioned at an obtuse angle to the bottom 201. This configuration aids in the transportability of the gully base as multiple bases can be easily nested into each other for transportation. The base 201 includes an extended member 203 at the top of each side member 202. This member 203 extends along the length of the base 103 along the top of the side member 202. This member is used to register and retain the lid 104.

The lid 104 comprises a flat region 204 and two side channels 205 at either side of the region 204. The region 204 includes one or more openings 105 for receiving plants, plant holders, and/or caps. The channel 205 is formed such as to engage and be retained by the member 203 of the base 103. The composition of the gully assembly determines the method by which the lid 104 is coupled with the base 103. If the material is slightly flexible, one channel of the lid 104 can be tucked over the member 203 on one side of the base. By slightly compressing the other side of the base toward the first, the lid 104 can be snapped into place.

In another embodiment, or if the material is more rigid, the lid 104 is aligned at one end of the base 103 and slid onto the base, with the members 203 registering and retaining the lid via channels 205.

The composition of the gully assembly should be of a material that is water resistant, lightweight, durable, and relatively chemically neutral to plants, sunlight, and the nutrient film. Examples of suitable materials include, but are not limited to, polyethylene, polypropylene, food grade plastics, and the like.

FIG. 3 illustrates a cross sectional view of a gully assembly according to one embodiment of the system. The figure illustrates the lid 104 engaged with the base 103. As can be seen in this example, the central region 204 of the lid is substantially parallel to the bottom portion 201 of the base 103. The flat portion 201 allows a consistent level of nutrient film across the base 103 with substantially equal depth. This is in contrast to prior art systems where the base is curved, leading to the nutrient film being deeper in the middle than in the sides. This requires a greater amount of nutrient film flow to provide consistent exposure to the root structure of any plants being grown with the system.

As can be seen in FIG. 3, the side member 205 of base 103 is of a size slightly smaller than the opening in channel 205 of the lid 104. This allows the free movement of the lid along the channel during assembly but retains the lid in place during operation of the system. The slope of the side members 202 in one embodiment is 105 degrees from the horizontal of the base. However this is by way of example only and other orientations and angles may be employed in the assembly.

FIG. 4 illustrates an end view of the system with plant holders 102 inserted into the openings in the lid 104 of the gully assemblies 101. The plant holders include a notch 401 that is substantially aligned with the flow if the nutrient film in the gully assembly. The plant holders can be sized such that they rest on the base 201 of the gully assembly while the notch 501 allows the growth or roots into the gully and the movement of nutrient film past the root system. In this manner, cultivation of plants may be accomplished without the need for soil.

What is claimed is:

1. A gully assembly comprising:
   a base member comprising a bottom member, two side members, and first and second rails formed on the side members;
   a lid member having at least one opening formed therein, the lid member comprising first and second channels formed therein for receiving, and being retained by, the first and second rails; and
   a plant holder inserted into the at least one opening,
   wherein a top portion of the plant holder is above the lid member.

2. The gully assembly of claim 1 wherein the two side members are at an obtuse angle relative to the bottom member.

3. The gully assembly of claim 2 wherein the obtuse angle is approximately 105 degrees.

4. The gully assembly of claim 3 wherein the base member and the lid member are comprised of food grade plastic.

5. The gully assembly of claim 3 wherein the base member and the lid member are comprised of polyethylene.

6. The gully assembly of claim 3 wherein the base member and the lid member are comprised of polyethylene.

7. The gully assembly of claim 3, wherein a notch aligned with a flow direction of nutrient film in the gully assembly is formed in the plant holder.

\* \* \* \* \*